United States Patent
Mogle, II et al.

(10) Patent No.: US 9,885,255 B2
(45) Date of Patent: Feb. 6, 2018

(54) SYSTEM FOR POSITIONING OF EQUIPMENT

(71) Applicant: General Electric Company, Schenectady, NY (US)

(72) Inventors: Thomas Alan Mogle, II, Simpsonville, SC (US); Kyle Joseph Conger, Greenville, SC (US); Michael Alan Davi, Niskayuna, NY (US); Stuart Craig Hanson, Anderson, SC (US); Robert Joseph Rohrssen, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/258,558

(22) Filed: Sep. 7, 2016

(65) Prior Publication Data

US 2016/0376927 A1 Dec. 29, 2016

Related U.S. Application Data

(62) Division of application No. 14/088,720, filed on Nov. 25, 2013, now Pat. No. 9,486,899.

(51) Int. Cl.
*F16M 11/12* (2006.01)
*B25H 1/00* (2006.01)
(Continued)

(52) U.S. Cl.
CPC ............ *F01D 25/285* (2013.01); *B25B 11/02* (2013.01); *B25H 1/0007* (2013.01); *B64D 27/26* (2013.01);
(Continued)

(58) Field of Classification Search
CPC ...... B23P 19/042; F01D 25/28; F01D 25/285; F05D 2260/02; F05D 2260/30;
(Continued)

(56) References Cited

U.S. PATENT DOCUMENTS

| 2,994,443 A | * | 8/1961 | Gordon | ............... B25H 1/0007 254/10 R |
| 4,069,922 A | * | 1/1978 | Hawkins | ................. B66C 23/42 212/181 |

(Continued)

FOREIGN PATENT DOCUMENTS

| EP | 2070663 A1 | * | 6/2009 | .............. B25J 9/042 |
| EP | 2070663 A1 | * | 6/2009 | .............. B25J 9/042 |
| EP | 3051077 A1 | * | 8/2016 | ........... F01D 25/285 |

OTHER PUBLICATIONS

Machine Translation of EP 2070663A1 via espacenet.com Mar. 20, 2017 http://translationportal.epo.org/emtp/translate/?ACTION=description-retrieval&COUNTRY=EP&ENGINE=google&FORMAT=docdb&KIND=A1&LOCALE=en_EP&NUMBER=2070663&OPS=ops.epo.org/3.2&SRCLANG=de&TRGLANG=en.*

*Primary Examiner* — Ryan D Kwiecinski
(74) *Attorney, Agent, or Firm* — Ernest G. Cusick; Hoffman Warnick

(57) ABSTRACT

Systems for the positioning of equipment are disclosed. A system of the present disclosure can provide an apparatus including: a height adjustable table; an arm support structure coupled to and positioned above the height adjustable table; a length adjustable arm slidably connected to the arm support structure, the length adjustable arm being configured to support a piece of equipment; and an equipment support bracket coupled to the length adjustable arm configured to removably attach the piece of equipment.

11 Claims, 12 Drawing Sheets

(51) Int. Cl.
  *B64D 27/26* (2006.01)
  *F02C 7/20* (2006.01)
  *F01D 25/28* (2006.01)
  *B25B 11/02* (2006.01)
  *B66F 3/22* (2006.01)
  *B66F 7/22* (2006.01)

(52) U.S. Cl.
  CPC .................. *B66F 3/22* (2013.01); *B66F 7/22* (2013.01); *F02C 7/20* (2013.01); *F16M 11/125* (2013.01); *B64D 2027/262* (2013.01); *F05D 2220/32* (2013.01); *F05D 2230/60* (2013.01); *Y10T 29/4978* (2015.01)

(58) Field of Classification Search
  CPC .... F16M 11/046; F16M 11/125; F16M 11/38; F16M 11/2021; A47B 2009/003; A47B 57/26; A47B 57/265; A47B 87/0223; B25H 1/007; B64D 27/26; B64D 2027/266; B64D 2027/264; B64D 2027/262; F02C 7/20
  USPC ......... 248/371, 398, 420, 421, 178.1, 185.1, 248/554, 555, 556, 557
  See application file for complete search history.

(56) References Cited

U.S. PATENT DOCUMENTS

| | | | | |
|---|---|---|---|---|
| 5,725,112 | A * | 3/1998 | Thorby | B66C 23/44 212/180 |
| 6,679,144 | B2 * | 1/2004 | Yeo | B23B 5/04 254/89 R |
| 2012/0124833 | A1 * | 5/2012 | Arendt | F03D 13/10 29/889.7 |
| 2017/0030092 | A1 * | 2/2017 | Young | E04F 21/00 |
| 2017/0051240 | A1 * | 2/2017 | Husemann | C12M 23/52 |

* cited by examiner

SYSTEM FOR POSITIONING OF EQUIPMENT

CROSS-REFERENCE TO RELATED APPLICATIONS

This application is a divisional of currently pending U.S. patent application Ser. No. 14/088,720 filed on Nov. 25, 2013. The application identified above is incorporated herein by reference in its entirety for all that it contains in order to provide continuity of disclosure.

BACKGROUND OF THE INVENTION

Embodiments of the present disclosure relate generally to apparatuses, systems, and methods for positioning pieces of equipment. More specifically, the present disclosure relates to the positioning (e.g., installation and removal) of heavy equipment, such as complex gas turbine combustors. Turbomachines (e.g., gas turbines) may include combustor units, also known as "combustors." Combustor units are chambers which typically receive high pressure air from a compression system of a gas turbine. In the combustor, fuel is introduced and ignited to significantly heat the air. The hot gases are then directed into the first stage nozzle and turbine, where power can be extracted. Stationary power generation gas turbines have become larger and more efficient as technologies and materials have improved. Larger power generation needs and the drive for ever improving efficiency has led to the development of larger and more complex gas turbines. In turn, turbine components such as compressors, combustors and turbine casings have become larger and more complex. Given the large capital cost of these components, it is crucial to handle them safely and efficiently without causing damage. Combustion system complexity is driven by the need to meet stringent exhaust emissions requirements, which impose additional component hardware constraints (multiple fuel manifolds, multiple nozzles, high pressure seals, air shields etc.) that make handling difficult, and damage prevention imperative.

FIG. 1 shows a cross-sectional view of a conventional turbine assembly T. Combustors T1, connected to fuel nozzles T2, are typically located between the compressor T3 and turbine T4 sections of turbine assembly T. Air T5 flows sequentially through compressor T3, combustor T1, and lastly through turbine T4. In axial flow compressor designs, combustors T3 are often oriented circumferentially around the central rotor and are sometimes canted to minimize overall axial turbine length. Combustors T1 oriented toward the upper face of turbine assembly T can be installed and removed with the aid of mechanical arms, cranes, and similar tools for positioning equipment. Pieces of equipment (e.g., combustors T1) and equipment fixture points oriented toward the lower half of a machine (i.e., below the centerline) may not be accessible, however, with conventional equipment positioning tools such as overhead cranes. Other machines besides gas turbines (e.g., turbine assembly T) may feature a similar arrangement of heavy components, and therefore may have similar limitations. Manual positioning of equipment, as an alternative to using a conventional crane or mechanical device, may not be possible where the equipment to be positioned is very heavy or large (e.g., combustor T1 of a complex gas turbine combustor).

BRIEF DESCRIPTION OF THE INVENTION

At least one embodiment of the present disclosure is described herein with reference to the positioning of equipment, such as gas turbine combustors. However, it should be apparent to those skilled in the art and guided by the teachings herein that embodiments of the present invention are applicable to any scenario in which equipment fixture points are inaccessible to conventional overhead (top-down oriented) apparatuses and systems.

A first aspect of the present disclosure provides an apparatus including: a height adjustable table; a platform coupled to the height adjustable table; a tilt adjuster coupled to the platform, the tilt adjuster being configured to tilt the platform relative to the height adjustable table; an equipment support structure slidably connected to the platform, the equipment support structure being configured to support a piece of equipment; a drive mechanism coupled to the platform and configured to slidably move the equipment support structure across the platform; and a bracket coupled to the equipment support structure, wherein the bracket is configured to removably attach the piece of equipment.

A second aspect of the present disclosure provides a system including: a scaffold having a raised surface; a height adjustable table slidably connected to and positioned above the raised surface of the scaffold; a platform coupled to and positioned above the height adjustable table, the platform having a guide rail thereon; a tilt adjuster coupled to the platform, the tilt adjuster being configured to tilt the platform relative to the height adjustable table; an equipment support structure positioned above the platform and slidably connected to the guide rail; a drive mechanism configured to slidably move the equipment support structure across the guide rail of the platform; and a bracket coupled to the equipment support structure, wherein the bracket is configured to removably attach a piece of equipment.

A third aspect of the present disclosure provides a system including: a scaffold having a raised surface; a height adjustable table slidably connected to and positioned above the raised surface of the scaffold; an arm support structure coupled to and positioned above the height adjustable table; a length adjustable arm slidably connected to the arm support structure; and an equipment support bracket coupled to the length adjustable arm, wherein the equipment support bracket further comprises: a bracket body; and a rotatable member rotatably coupled to the bracket body for removably attaching a piece of equipment; wherein the bracket body is further configured to lock to the rotatable member in an angular orientation.

A fourth aspect of the present disclosure provides a method including: substantially aligning an equipment support structure with an equipment fixture point of a casing structure; adjusting the equipment support structure to have a selected height and a selected angle; sliding the equipment support structure across a platform having the selected height and the selected angle to reach the equipment fixture point; and coupling a piece of equipment to one of the equipment support structure and the equipment fixture point.

A fifth aspect of the present disclosure provides a method including: substantially aligning a rotatable equipment support bracket of a suspended bracket member with an equipment fixture point of a casing structure; affixing a counterweight to one of the rotatable equipment support bracket and the suspended bracket member; moving the rotatable equipment support bracket to a selected rotational position; contacting the equipment fixture point with the rotatable equipment support bracket; and coupling a piece of equipment to one of the rotatable equipment support bracket and the equipment fixture point.

A sixth aspect of the present disclosure provides a method including: substantially aligning an arm, having a rotatable equipment support bracket, with an equipment fixture point of a casing structure; adjusting the arm to have a selected height and a selected angle; contacting the equipment fixture point with the rotatable equipment support bracket; and coupling a piece of equipment to one of the rotatable equipment support bracket and the equipment fixture point.

BRIEF DESCRIPTION OF THE DRAWING

These and other features of the disclosed apparatus will be more readily understood from the following detailed description of the various aspects of the apparatus taken in conjunction with the accompanying drawings that depict various embodiments of the invention, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

When an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 2:
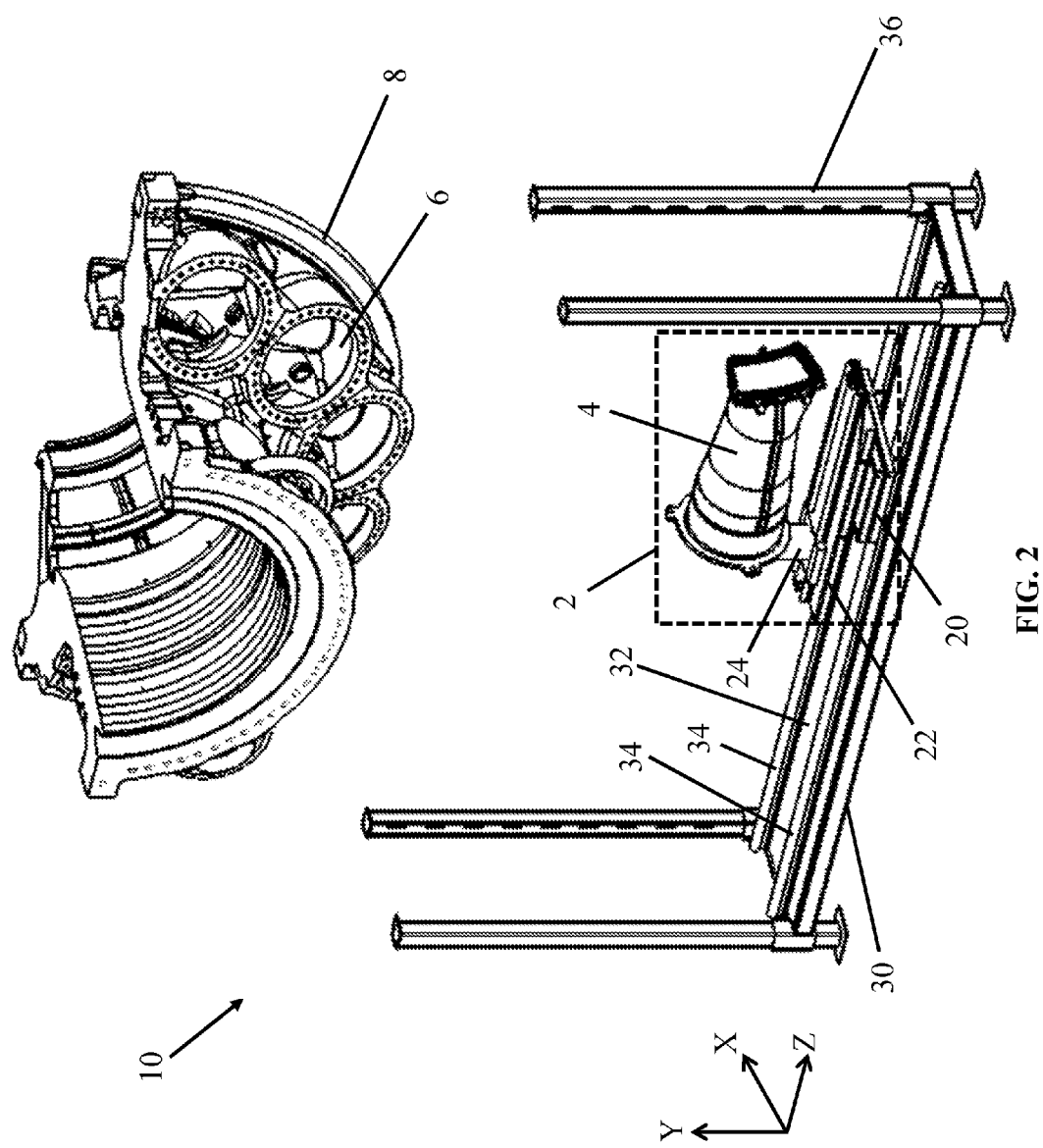
FIG. 2 is a perspective view of an apparatus, system, and piece of equipment according to an embodiment of the present disclosure.

Embodiments of the present disclosure include apparatuses, systems for positioning (e.g., installing and removing) equipment, and to methods of doing the same. In FIG. 2, an apparatus 2 according to an embodiment of the disclosure is shown. Apparatus 2 can position pieces of equipment 4 configured for use with an equipment fixture point 6. Equipment fixture point 6 can be located on a larger structure, e.g., a turbine casing 8 (shown in FIG. 2 in a partial cutaway view). In particular, apparatus 2 can position equipment 4 at an equipment fixture point 6 inaccessible to conventional overhead devices, such as cranes, which may be oriented downward and/or obstructed by another body such as turbine casing 8.

Though apparatuses, systems, and methods of the present disclosure are described herein with reference to turbine casing 8, it is understood that the present disclosure may also be applicable to other situations involving, for example, large removable pieces of equipment which are difficult or impossible to access with overhead positioning equipment, e.g., cranes. Apparatus 2 can orient equipment 4 in an upwards, angular direction to align equipment 4 with equipment fixture point 6, as discussed herein. Other embodiments of the present disclosure include a system 10 for positioning equipment 4, of which an embodiment of apparatus 2 can be a component. In FIGS. 2-12, an example set of axes X, Y, and Z are provided for the sake of clarity and demonstration. Various types of movement relative to each axis X, Y, and Z are discussed to illustrate the various types of movement provided herein. However, it is further understood that embodiments of the present disclosure can include reorienting any given reference axis to thereby adapt to various situations and design needs.

In addition to positioning equipment 4, several structures of apparatus 2 can support and/or move equipment 4. In FIG. 2, apparatus 2 is shown by example to be coupled, at its base, to a height adjustable table 20. Height adjustable table 20 can be moved upwards and downwards to adjust the vertical position of equipment 4 and/or other components located above height adjustable table 20. A platform 22 can be coupled to (e.g., directly above) height adjustable table 20, and thus may be raised or lowered along with height adjustable table 20. An equipment support structure 24 may be coupled to the surface of platform 22, and is shown by example herein as being substantially in the form of an "L" bracket supporting equipment 4. Although equipment support structure 24 is shown by example to support equipment 4 in a cantilevered manner, equipment support structure 24 can also extend forward to support equipment 4 at or near its center of gravity. The portion of equipment support structure 24 used to contact equipment 4 can have a cross sectional area of the same or similar size as equipment 4 to create a point of coupling to apparatus 2. In some embodiments, equipment support structure 24 can be slidably coupled to the surface of platform 22, e.g., with one or more guide rails 48 (FIG. 3) allowing equipment support structure 24 to move across the surface of platform 22. In addition to rails, slidable coupling between equipment support structure 24 and platform 22 can be provided through, e.g., dovetails, magnetic contact, mechanically adjustable gears, rotatable couplings, and other forms of coupling capable of allowing one component to slide relative to another, whether currently known or later developed. In addition, various other slidable components discussed herein can additionally or alternatively be provided in the form of any form of slidable coupling discussed herein, in addition to others currently known or later developed.

As also shown in FIG. 2, embodiments of the present disclosure can include a system 10 for positioning equipment 4. Embodiments of the present disclosure can safely and efficiently position (e.g., install and remove) equipment 4 with a mass of, for example, up to approximately one thousand kilograms. One or more components of system 10 can be composed of a material capable of supporting large masses and components, e.g., structural steel. Components of system 10 discussed herein can and also include various lifts, drive mechanisms, rails, bolts, brackets, etc. made from similar or stronger materials to support the mass and weight of the equipment being positioned. System 10 can include other structural components designed to move apparatus 2 and equipment 4. In an embodiment, system 10 can include a scaffold 30 with a raised surface 32, to which apparatus 2 can be coupled. In an embodiment, a guide track 34 can slidably connect apparatus 2 to raised surface 32 of scaffold 30. Through guide track 34, apparatus 2 can move across raised surface 32 of scaffold 30. In addition, height adjustable members 36 of scaffold 30 can further adjust the height of equipment 4 and apparatus 2.

Figure 3:
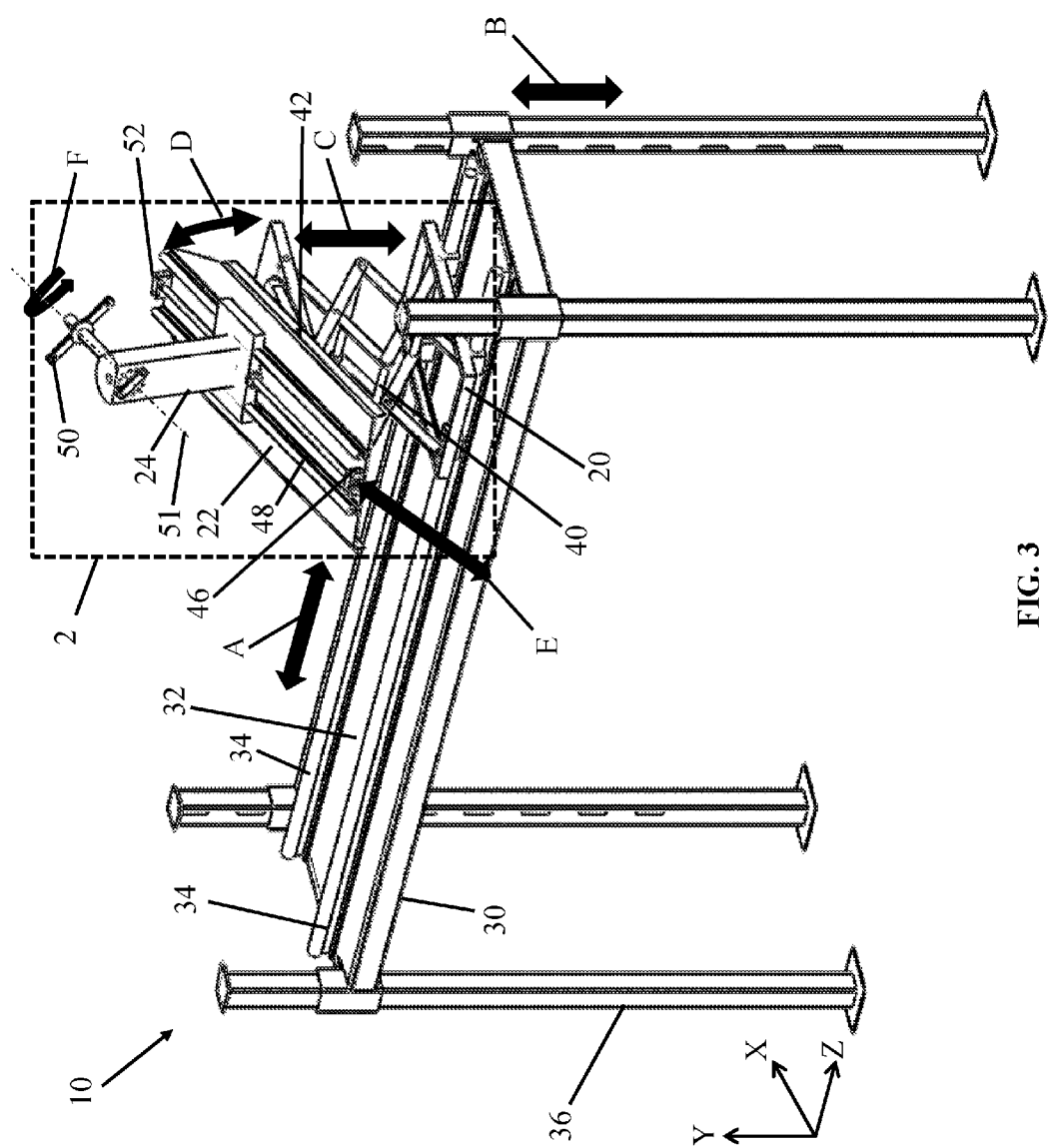
FIG. 3 is a perspective view of an apparatus and system according to an embodiment of the present disclosure.

Turning to FIG. 3, an embodiment of apparatus 2 and system 10 is shown in detail. Motion of apparatus 2 (including height adjustable table 20) along the direction of arrow A is possible, e.g., by apparatus 2 being slidably connected to raised surface 32 of scaffold 30. Apparatus 2 can also be moved vertically through the use of height adjustable members 36 of scaffold 30. Height adjustable members 36 can include mechanical latches, stops, and similar structures configured to interconnect with scaffold 30 of system 10, allowing or prohibiting movement of scaffold 30 and raised surface 32 along the direction of arrow B. Height adjustable table 20 can be set to different heights with a height adjustment mechanism 40, shown by example in FIG. 3 as being in the form of a scissor lift. In other embodiments, height adjustment mechanism 40 can include, for example, a jackscrew, a hydraulic lift, and/or a pneumatic lift. Height adjustment mechanism 40 can allow height adjustable table 20 to vertically extend and retract along the direction of arrow C. As shown by example in FIG. 3, the position of height adjustment mechanism 40 can directly affect the height of platform 22.

A tilt adjuster 42 can be coupled to platform 22, and may be in the form of a tilting mechanical connection such as, for example, a large industrial hinge or mechanically adjustable incline capable of tilting along the direction of arrow D. If desired, tilt adjuster 42 may be powered by an external source (not shown), e.g., an electric, hydraulic, or pneumatic motor or manual geared screw adjustment. In an embodiment, a tilt support member (not shown) can be coupled between height adjustable table 20 and platform 22. Tilt adjuster 42 can thus allow platform 22 to be adjustably moved to several angular positions.

To move equipment support structure 24 across the surface of platform 22, a drive mechanism 46 can be coupled (e.g., mechanically, pneumatically, hydraulically, or electrically) to equipment support structure 24. Further, drive mechanism 46 can be positioned on height adjustable table 20, platform 22, equipment support structure 24, or another component of apparatus 2. As shown by example in FIG. 3, drive mechanism 46 can be a linear actuator connected to equipment support structure 24 with a threaded drive rod, allowing equipment support structure 24 to move along the direction of arrow E. In other embodiments, drive mechanism 46 can be a threaded rod, a piston, and/or a rail capable of moving substantially along guide rails 48, e.g., along the direction of arrow E. For example, a threaded rod can move across platform 22 by being actuated, and this movement can apply a force equipment support structure 24 along the direction of desired movement, e.g., along arrow E. To provide sliding movement of equipment support structure 24 across platform 22, a guide rail 48 can be attached to platform 22. Equipment support structure 24 can travel across guide rail 48 in response to forces imparted from drive mechanism 46, allowing the location of equipment support structure 24 to be adjusted.

A bracket 50 can project from equipment support structure 24 of apparatus 2. Bracket 50 can removably attach equipment 4 (FIG. 2) to apparatus 2 in each embodiment discussed herein. Bracket 50 may be rotatably adjusted along the direction of arrow F to be positioned in different angular orientations as discussed elsewhere herein. In addition, bracket 50 can rotate equipment 4 attached thereto (FIG. 2) about a centerline axis 51 of equipment support structure 24 and/or equipment 4 (FIG. 2). Additionally or alternatively, equipment support structure 24 can be configured to removably attach a forward end flange 58 (shown in FIG. 4) of equipment 4 (FIG. 2). An aligner 52 may also be coupled to apparatus 2, e.g., on platform 22, allowing a user of apparatus 2 to align equipment support structure 24 or bracket 50 with equipment 4 (FIG. 2). Generally, aligner 52 may be a measuring device such as an optical measuring device, a mechanical measuring device, an angular measuring device, or similar apparatus used to indicate an orientation or position. Aligner 52 can indicate a path of alignment between apparatus 2 and equipment fixture point 6 (FIG. 2).

Figure 4:
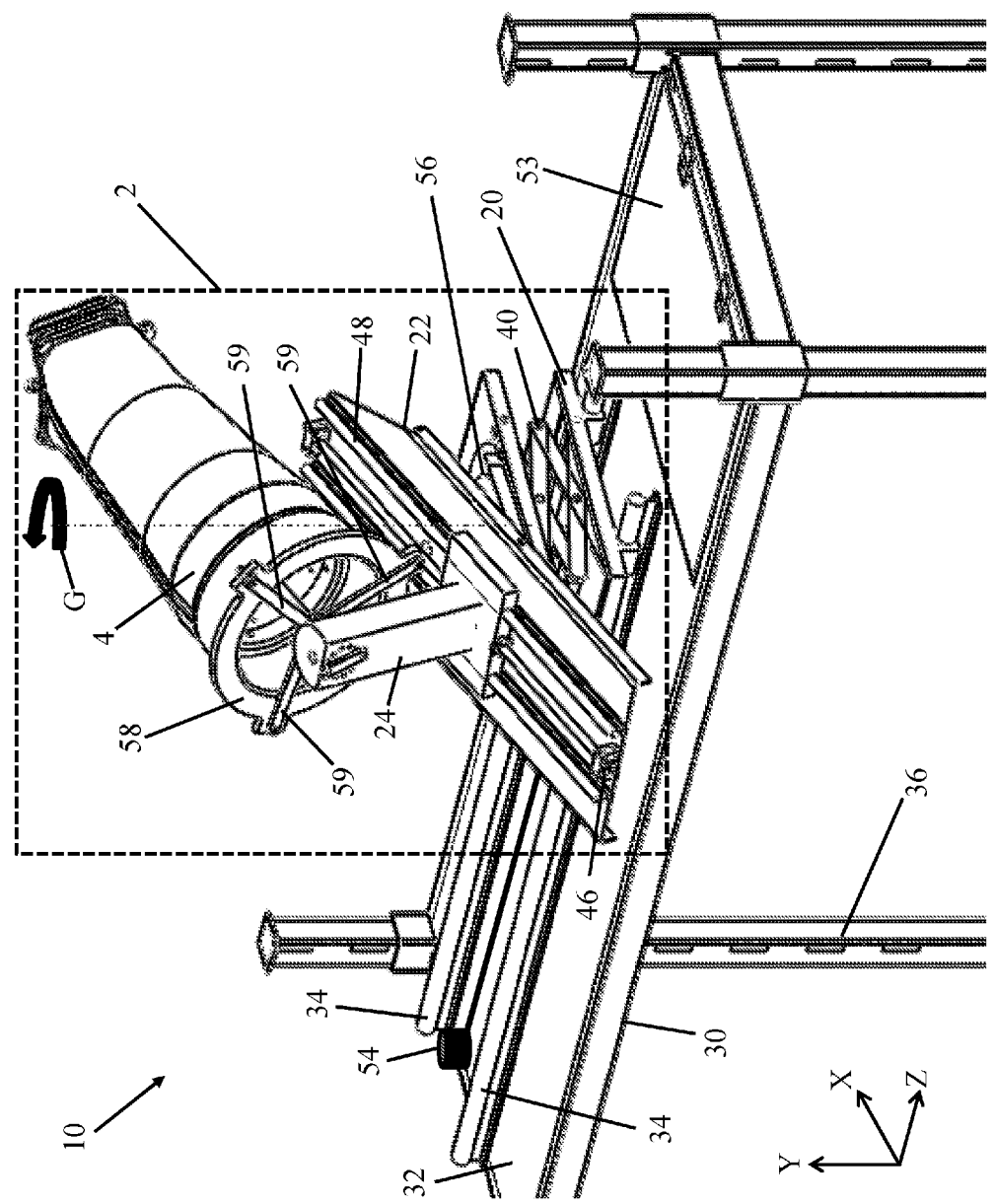
FIG. 4 is another perspective view of an apparatus, system, and piece of equipment according to an embodiment of the present disclosure.

Turning to FIG. 4, another view of apparatus 2 and system 10 is shown. An adjustable hatch 53, dimensioned to allow passage of equipment 4, can be located on raised surface 32 of scaffold 30. If desired, additional guide tracks (not shown) can extend across the upper face of hatch 53, allowing apparatus 2 to be positioned above the closed hatch 53 if desired. Adjustable hatch 53 can be opened and closed during the positioning of equipment 4. For example, equipment 4 can be detached from equipment support structure 24 and loaded onto a mechanical arm, such as a crane, and then passed through adjustable hatch 53. It is also understood that these steps can also occur in a different or even opposite order.

To move apparatus 2 across scaffold 30 via guide track 34, a guide track drive mechanism 54 can be mechanically, hydraulically, pneumatically, or electrically coupled to height adjustable table 40. Guide track drive mechanism 54, similar to drive mechanism 46, can impart a force to height adjustable table 20 to cause movement, e.g., substantially within the X-Z plane. As an example, guide track drive mechanism 54 can be in the form of a linear actuator as shown in FIG. 4. In other embodiments, guide track drive mechanism 54 can be a threaded rod, a piston, and/or a rail. A rotatable coupler 56 can vertically couple platform 22 (and equipment support structure 24 as shown in FIG. 4) with height adjustable table 20. Rotatable coupler 56 can permit platform 22 and any components located thereon to "swivel" or rotate along the direction of arrow G. Equipment support structure 24 can be connected to a forward end flange 58 of equipment 4. Forward end flange 58 may be, for example, a ring projecting circumferentially from one end of equipment 4, which can be used to engage equipment support structure 24. In addition, forward end flange 58 can serve other structural purposes, e.g., acting as a surface of contact with other components, when installed within equipment fixture point 6 (FIG. 2). To further support forward end flange 58, one or more struts 59 can engage an end cross-section of equipment 4. Each strut 59 can be decoupled from equipment 4, allowing equipment 4 to be removed from apparatus 2 and system 10. Struts 59 can have particular lengths for various types of equipment 4, and may be exchanged for struts 59 of different sizes to accommodate different types of equipment 4. Though struts 59 are shown by example in FIGS. 4 and 6 as appropriate for use with apparatus 2 and system 10, it is understood that struts 59 can also be used in other apparatuses and methods discussed elsewhere herein.

Figure 5:
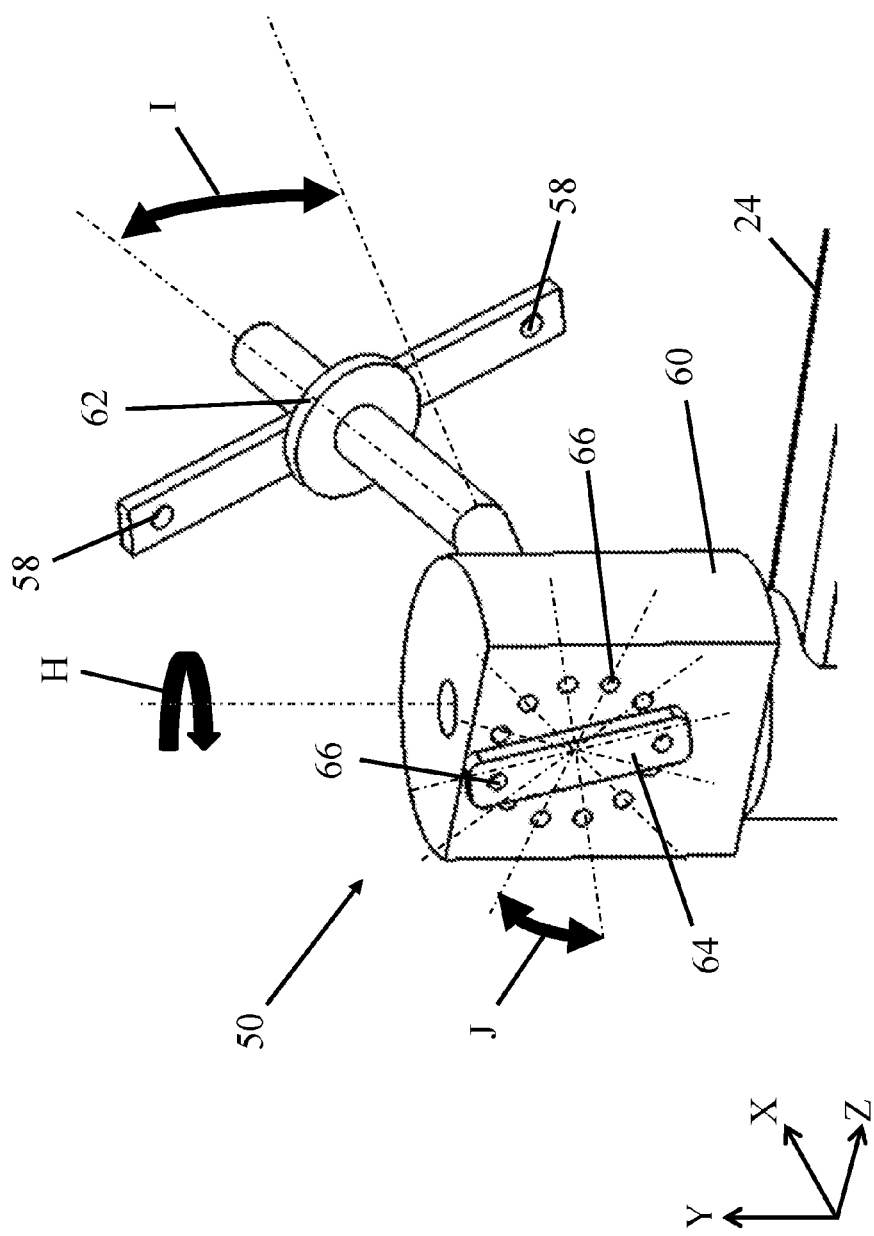
FIG. 5 is a perspective view of a bracket according to an embodiment of the present disclosure.

Turning to FIG. 5, an embodiment of bracket 50 is shown in detail. Bracket 50 can include a bracket body 60, to which other components of bracket 50 can be connected. Bracket body 60 can be rotatably attached to equipment support structure 24, allowing bracket 50 to rotate along arrow J to various orientations. A rotatable member 62, designed to removably attach equipment 4 (FIGS. 2, 4) can project from bracket body 60 at an angle I relative to at least one axis, e.g., axis Z. Rotatable member 62 can extend partially or completely through bracket body 60 and terminate at a bracket lock 64. Bracket lock 64 can be rotated to different orientations along the direction of arrow J, examples of which are designated in FIG. 5 by phantom lines. Bracket lock 64 can be locked into place at a chosen location via inserting a bolt or pin (not shown) through locking mechanisms 66. As demonstrated by example in FIG. 5, locking mechanisms 66 can be in the form of holes configured to accept a locking component (not shown) such as a bolt or pin, thereby preventing further rotation. As a result, the orientation of rotatable member 62 can be further customized by using locking mechanisms 66 to hold rotatable member 62 at a particular position.

Figure 6:
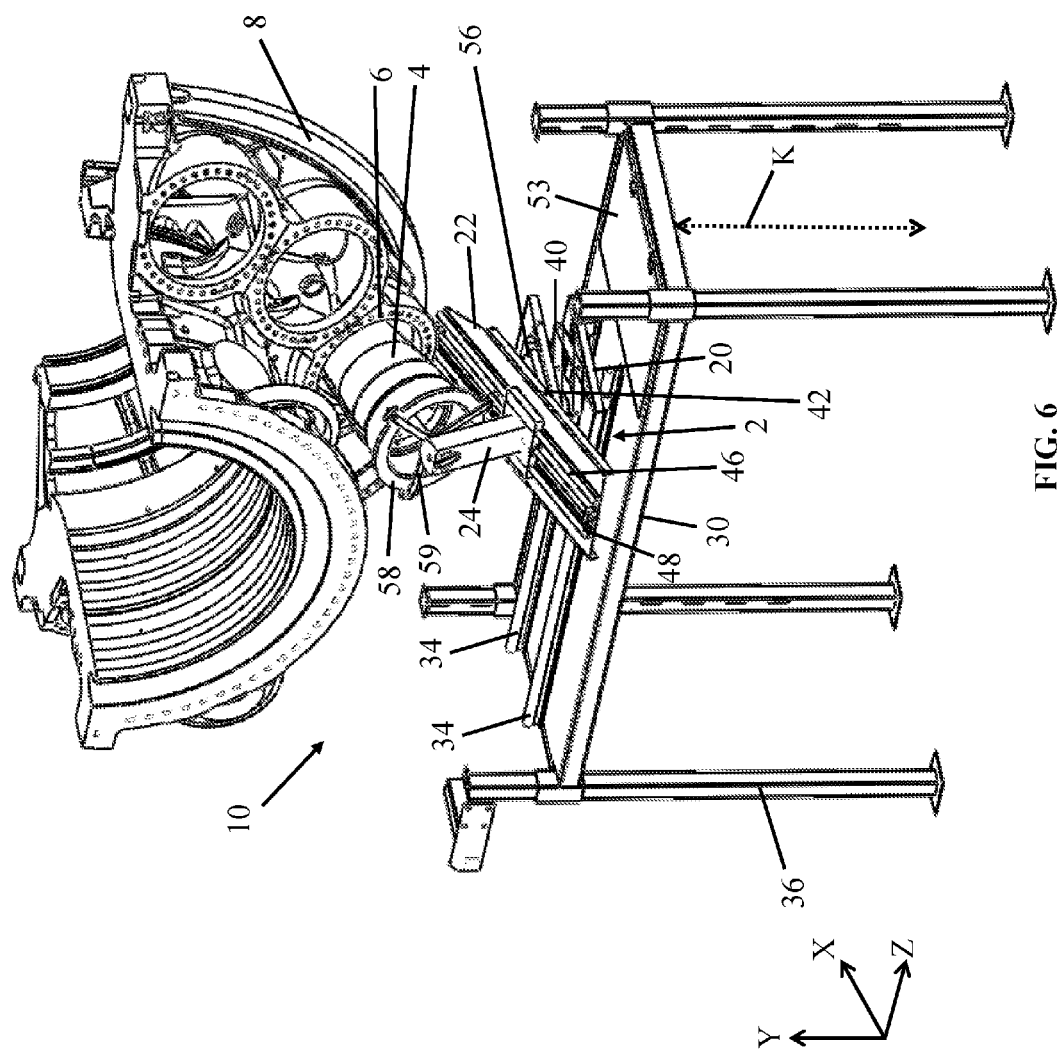
FIG. 6 is a perspective view of an apparatus being used in a method according to an embodiment of the present disclosure.

Turning to FIG. 6, an example method of using apparatus 2 or system 10 to position (e.g., install or remove) equipment 4 is shown. Equipment support structure 24 can be substantially aligned with equipment fixture point 6, which may be located within turbine casing 8. As used herein, the term "substantial alignment" or "substantially aligned" can refer to any alignment by which equipment support structure 24 can be moved to reach equipment fixture point 6. If desired, height adjustable table 20 can be moved across scaffold 30 (e.g., via guide track 34) to reach a desired location, and the vertical position of height adjustable table 20 can also be adjusted (e.g., with height adjustment mechanism 40). The various components of apparatus 2 and/or system 10, discussed elsewhere herein, can be moved to adjust the positions of platform 22 and equipment support structure 24, thereby allowing apparatus 2 to reach a selected height and a selected angle relative to at least one axis, e.g., axis Z. In addition, the angular orientation of platform 22 and equipment support structure 24 can be adjusted via tilt adjuster 42 and/or rotatable coupler 56. A user can then move equipment support structure 24 (e.g., with drive mechanism 46 and guide rail 48) across platform 22 to reach equipment fixture point 6. Having been positioned with apparatus 2 and/or system 10, equipment 4 can be coupled to equipment support structure 24 or equipment fixture point 6. In addition, rotatable member 62 (FIG. 5) of bracket 50 (FIG. 5) can be rotated about a centerline axis of equipment 4 to adjust the angular orientation of equipment 4 while equipment 4 is being positioned.

Embodiments of a method for positioning of equipment 4 can optionally include further actions. For example, height adjustable table 40 can move across scaffold 30 (e.g., via guide track 34) with equipment 4 being attached thereto. Equipment 4 can be physically removed from equipment support structure 24 with the aid of an external component (not shown), such as a mechanical arm (e.g., a crane). Adjustable hatch 53 can then be opened, and the mechanical arm can pass equipment 4 through adjustable hatch 53 along the direction of arrow K. As a result, equipment 4 can be removed from system 10 in a stable and secure manner. It is also understood that the actions discussed herein can be carried out in a different or reverse order.

Figure 7:
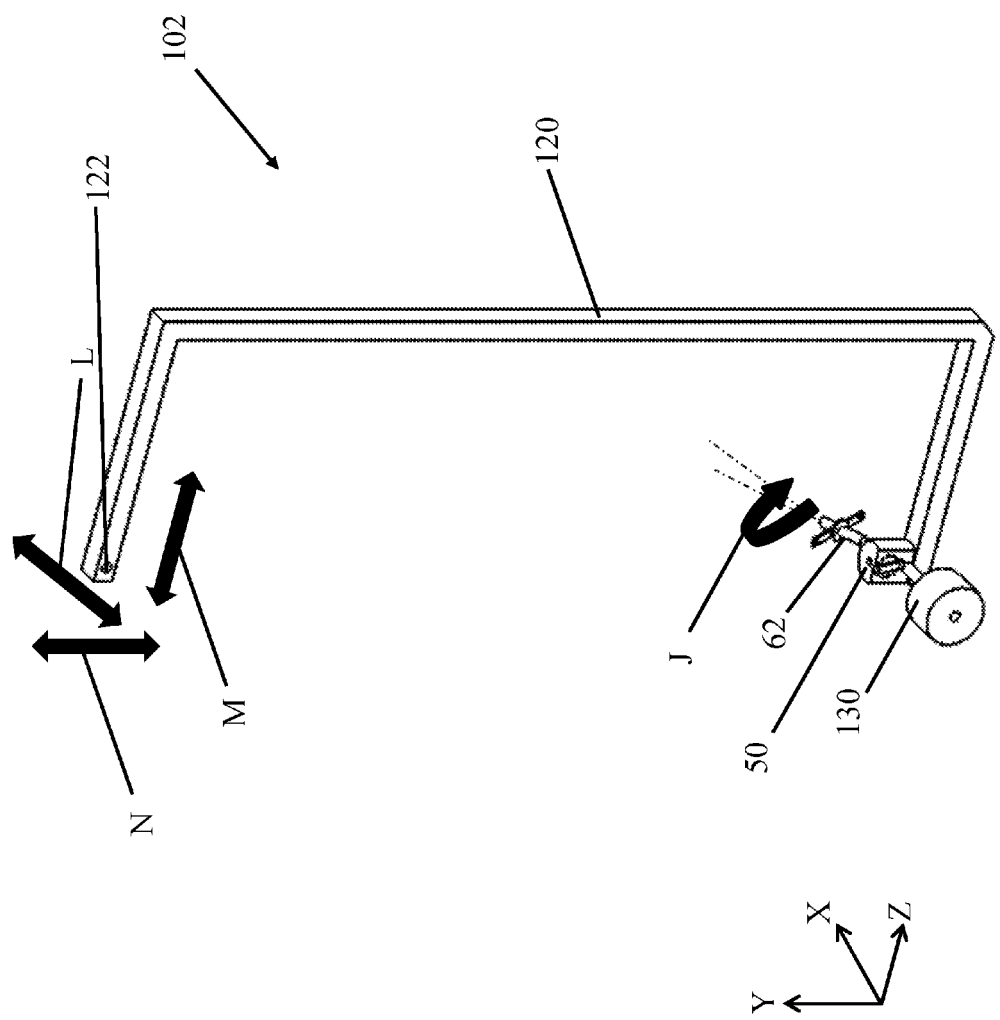
FIG. 7 is a perspective view of a suspended bracket member according to an embodiment of the present disclosure.

Turning to FIG. 7, an apparatus 102 for carrying out a method according to an embodiment of the disclosure is shown. Bracket 50 can be coupled to a terminus of a suspended bracket member 120. Suspended bracket member 120 can be coupled to a mechanical component or device located overhead and coupled to suspended bracket member 120 at support terminus 122 via a crane or hoist (not shown). Suspended bracket member 120 may have any geometry configured to extend circumferentially about turbine casing 8 (FIGS. 2, 6) or any similarly large structure. For example, suspended bracket member 120 can be in the form of a "C-hook," a "J-hook," or another assembly capable of extending about the surface of a larger structure, such as turbine casing 8 (FIG. 2). The coupling of suspended bracket member 120 at support terminus 122 can permit a user to move suspended bracket member 120 in three dimensions, shown by example in FIG. 7 along arrows L, M, and N. As described herein, suspended bracket member 120 can have a structure between support terminus 122 and bracket 50 that wraps around a larger structure or casing, such as turbine casing 8 (FIGS. 2, 6) as shown and discussed elsewhere herein.

Similar to the embodiment shown and described with reference to FIG. 5, rotatable member 62 can be coupled to bracket 50 and project therefrom. Rotatable member 62 can be rotated along the direction of arrow J to be oriented in various rotational positions, and can be locked into place with bracket lock 64 (FIG. 5) and locking mechanism 66 (FIG. 5) or any similar mechanisms currently known or later developed. Rotatable member 62 can thus be rotated along the direction of arrow J to reach various angular orientations. To accommodate large masses, a counterweight 130 can be affixed to bracket 50, and may allow apparatus 102 to support weights of up to, e.g., one thousand kilograms. It is understood that bracket 50 and rotatable member 62 can support even greater weights by using different types of counterweights 130. Counterweights 130 can be composed of, e.g., lead, sand, water, or other substances capable of balancing the weight of equipment 4 to increase stability and control.

Figure 1:
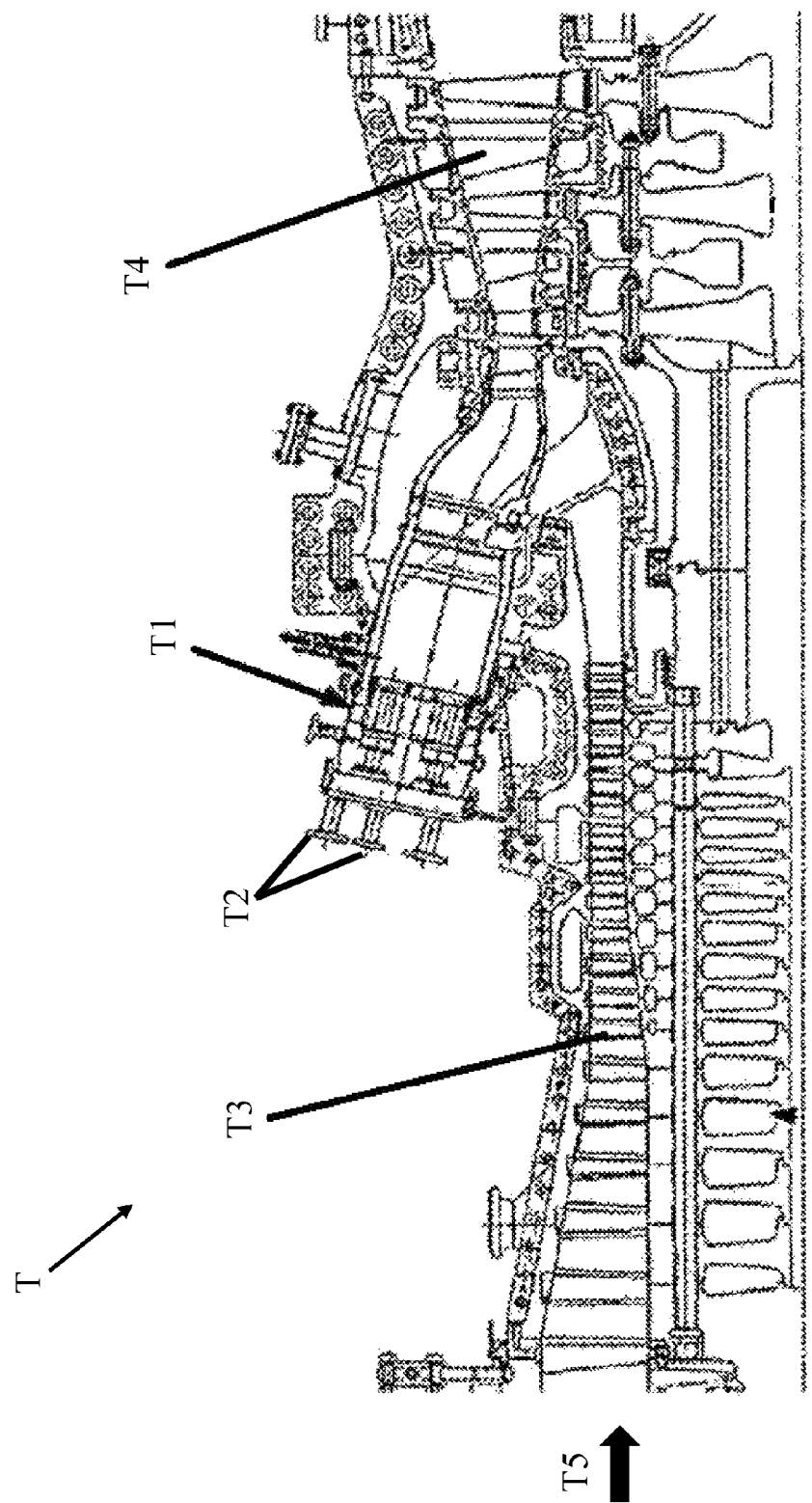
FIG. 1 is a cross sectional view of a conventional turbine assembly.
Figure 8:
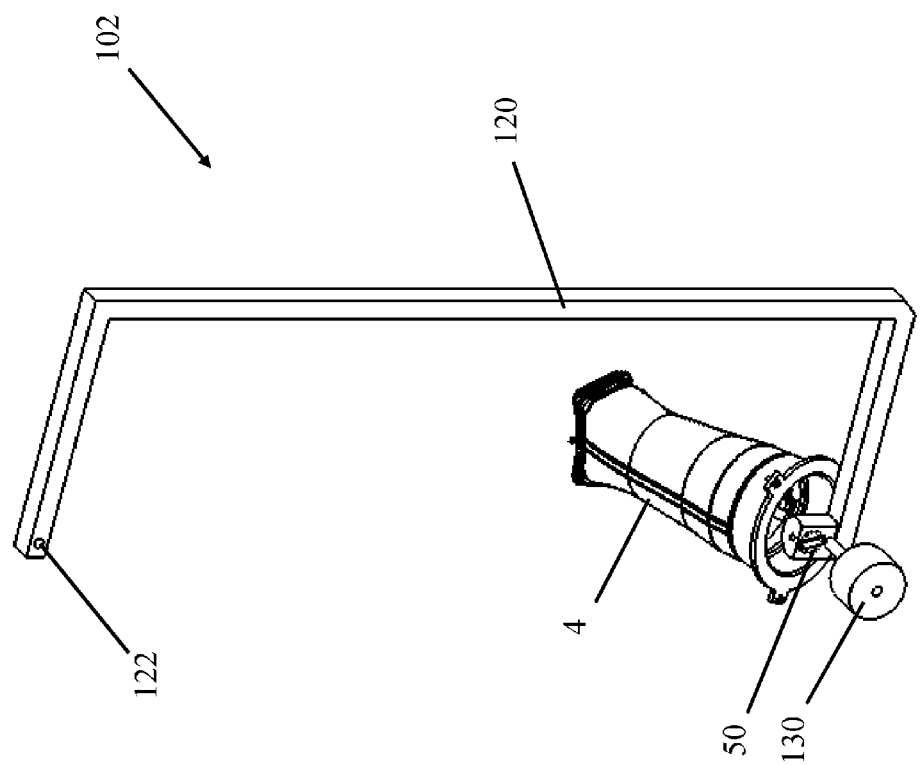
FIG. 8 is a perspective view of a suspended bracket member coupled to a piece of equipment according to an embodiment of the present disclosure.

Turning to FIG. 8, equipment 4 can be coupled to bracket 50 of suspended bracket member 120. Counterweight 130 can be affixed to an opposite or offsetting area of suspended bracket member 120 to balance the load and increase control over equipment 4 as it moves. If desired, counterweight 130 may be affixed to suspended bracket member 120 at approximately the same time as the coupling of equipment 4 to bracket 50. In addition, counterweight 130 can be removed from suspended bracket member 120 after equipment 4 has been removed from bracket 50. In an embodiment, equipment 4 can be a component of a gas turbine combustor, such as a combustor connected to a fuel nozzle assembly, as found in complex turbomachines, e.g., a combustor T1 (FIG. 1) with one or more fuel nozzle assemblies T2 (FIG. 1). Rotatable member 62 (FIGS. 5, 7) can also rotate equipment 4 about its axial centerline axis, allowing equipment 4 to be adjusted during the positioning of equipment 4.

Figure 9:
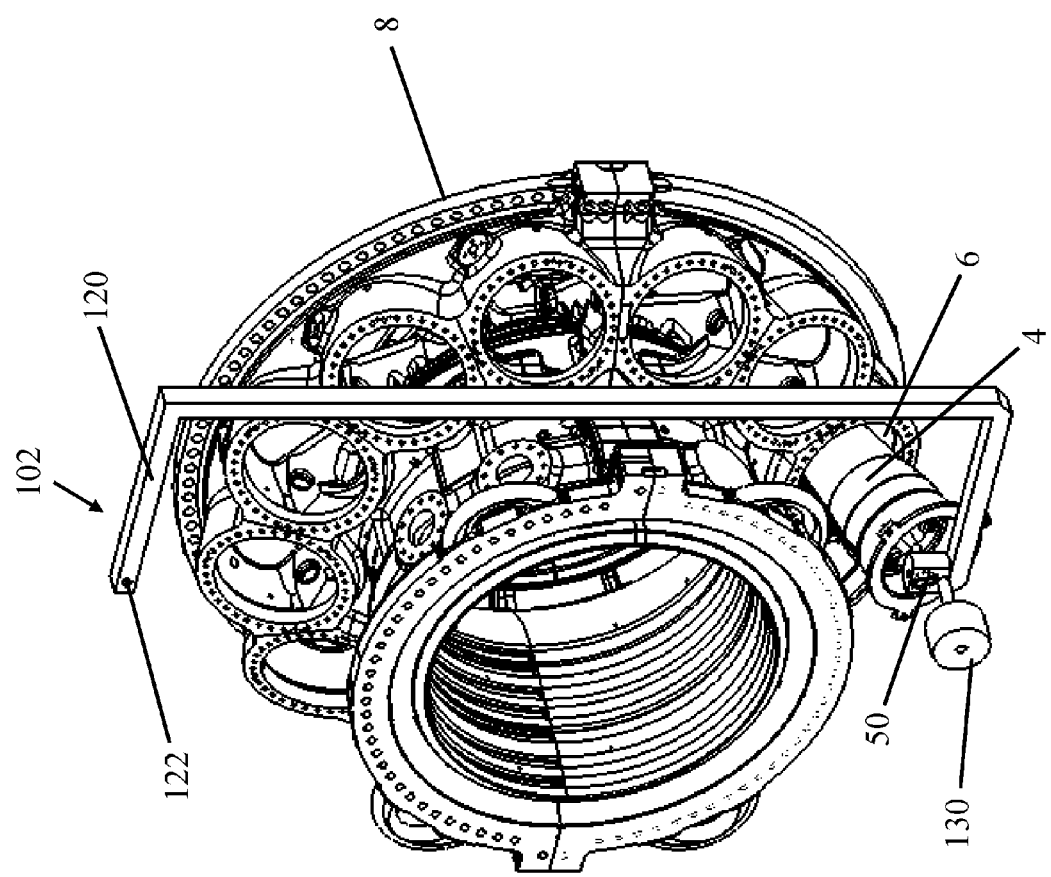
FIG. 9 is a perspective view of a suspended bracket member being used in a method according to an embodiment of the present disclosure.

As shown in FIG. 9, an apparatus 102 can be used in a method according to the present disclosure. Bracket 50 can be substantially aligned with and moved to an equipment fixture point 6 through the use of suspended bracket member 120. Equipment 4 can be suspended from above with apparatus 102, and coupled to either bracket 50 or equipment fixture point 6 to position equipment 4. As a result, equipment 4 can be positioned at points that would normally be inaccessible to a simple crane or other conventional overhead device. It is understood that terminus 122, during the positioning of equipment 4, is connected to an overhead crane, hoist, or other lift device used to move suspended bracket member 120. However, this connection is omitted in FIG. 9 for the purposes of clarity.

Figure 10:
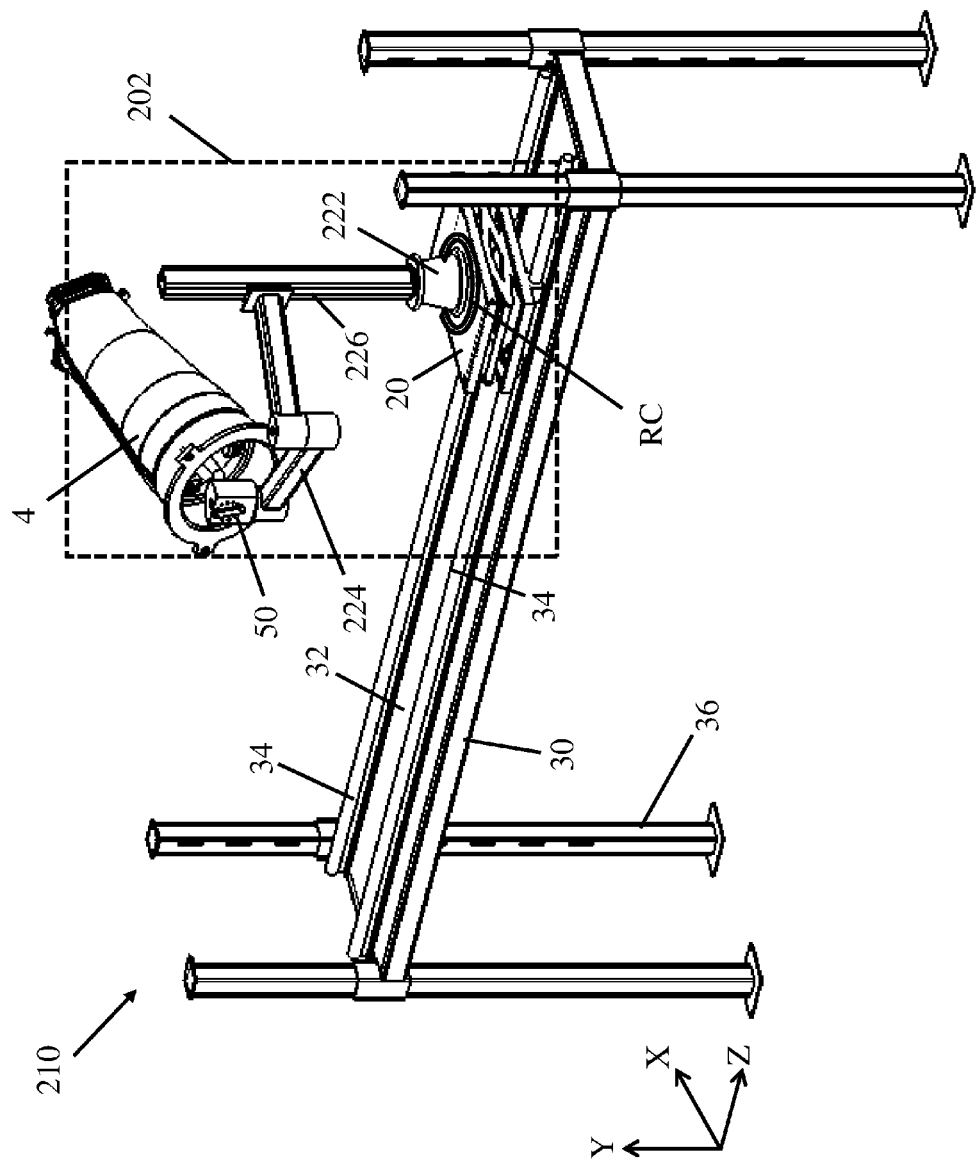
FIG. 10 is a perspective view of another system and apparatus with a piece of equipment according to an embodiment of the present disclosure.

In FIG. 10, an apparatus 202, and a system 210 according to an embodiment of the disclosure are shown. Apparatus 202 and system 210 can be used in methods according to the present disclosure to position equipment 4. In some embodiments, equipment 4 can be a gas turbine combustor T1 (FIG. 1) and/or a fuel nozzle assembly T2 (FIG. 1) of a turbine assembly T (FIG. 1).

Generally, scaffold 30 with raised surface 32 and guide track 34 located thereon can be used in system 210. Height adjustable table 20 can be slidably connected to and positioned above raised surface 32 of scaffold 30, and the capacity for sliding can be provided by height adjustable table 20 being coupled to guide track 34. Apparatus 202 can also include an arm support structure 222 rotatably coupled to and positioned above height adjustable table 20 through a rotatable coupler RC. A length adjustable arm 224 can be slidably connected to arm support structure 222, and thus movable to various vertical positions. Length adjustable arm 224 can be in the form of a mechanical arm such as the "Zero-G®" mechanical arm available from Equipois, Inc., or a "portable articulating tool support" similar to the installation shown and described in U.S. Pat. No. 7,325,777. Bracket 50 can be coupled to an end of length adjustable arm 224, and can removably attach equipment 4. The components of bracket 50 can be substantially similar to those discussed with respect to FIG. 5, such as bracket body 60 (FIG. 5), rotatable member 62 (FIG. 5) rotatably coupled to bracket body 60 (FIG. 5), bracket lock 64 (FIG. 5) with locking mechanism 66 (FIG. 5), and/or similar mechanisms currently known or later developed.

Figure 11:
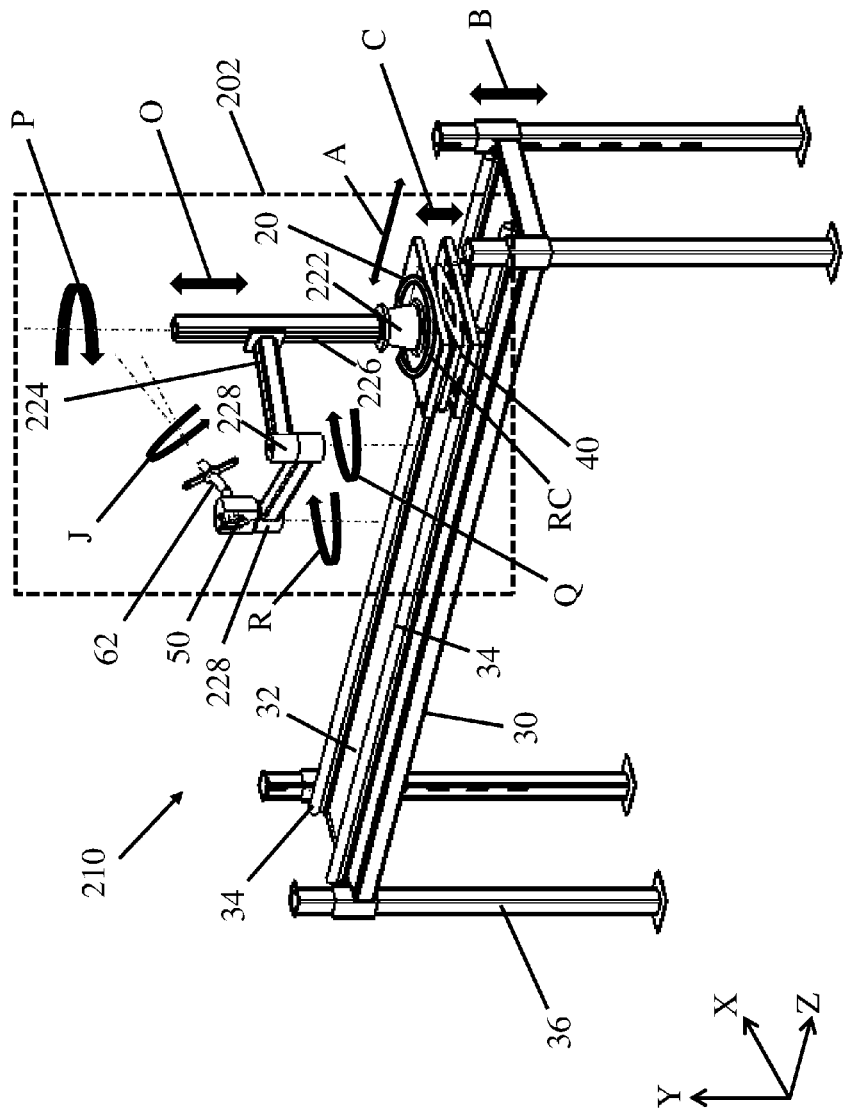
FIG. 11 is a perspective view of a system and apparatus according to an embodiment of the present disclosure.

In FIG. 11, several types of motion achievable with apparatus 202 and system 210 are shown, as indicated by arrows J, O, P, Q, and R. Similar to other embodiments of the disclosure, guide track 34 can allow height adjustable table 20 to move along the direction of arrow A, height adjustable members 36 can allow scaffold 30 to move along the direction of arrow B, and height adjustment mechanism 40 can extend or retract height adjustable table 20 along the direction of arrow C. In an embodiment, length adjustable arm 224 can be coupled to arm support structure through an arm support rail 226, allowing length adjustable arm 224 to slide vertically to reach various positions along the direction of arrow O. In addition, length adjustable arm 224 can be locked into place on arm support rail 226 via mechanical locking devices (not shown) such as latches, pins, etc. Arm support structure 222 can also be rotatably coupled to height adjustable table 20 through rotatable coupler RC, and as a result can be rotated along the direction of arrow P to adjust the placement of length adjustable arm 224 and bracket 50. Length adjustable arm 224 can be further customized by including one or more rotatable joints 228 (two shown by example in FIG. 11) thereon, which as an example can be rotated along the direction of arrows Q and/or R to influence the position of bracket 50. Bracket 50 can also be rotatably coupled to length adjustable arm 224, and thus rotated along the direction of arrow R to adjust the position of rotatable member 62.

Figure 12:
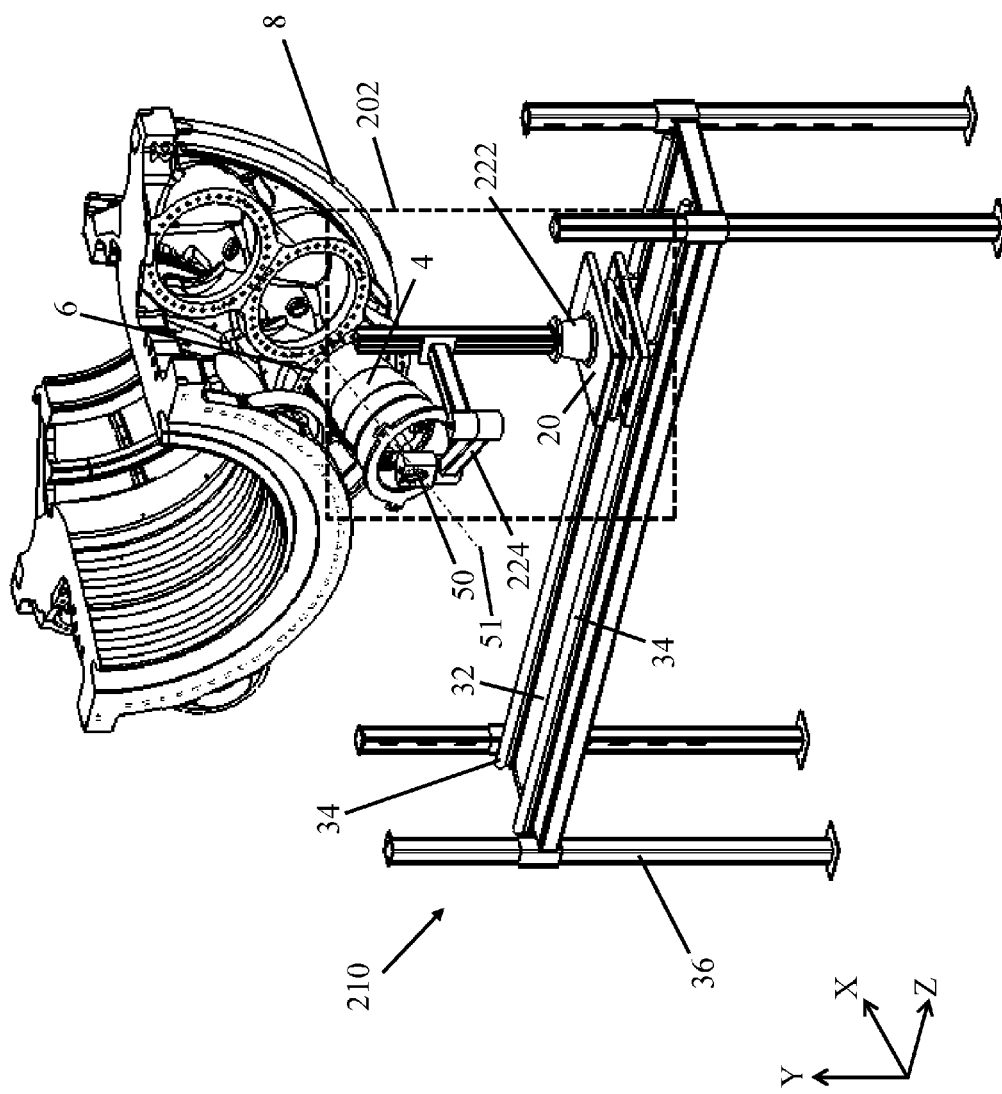
FIG. 12 is a perspective view of a system being used in a method according to an embodiment of the present disclosure.

FIG. 12 depicts an example method according to an embodiment of the present disclosure. A user of apparatus 202 and/or system 210 can substantially align bracket 50 of length adjustable arm 224 with equipment fixture point 6. During or following the substantial aligning of bracket 50 with equipment fixture point 6, length adjustable arm 224 can be adjusted to have a selected height and a selected angle relative to a reference level, e.g., the X-Z plane. Bracket 50 can contact equipment fixture point 6, and couple equipment 4 to bracket 50 or equipment fixture point 6, thereby positioning (e.g., installing or removing) equipment 4. In an embodiment, the method can include moving arm support structure 222 and length adjustable arm 224 across raised surface 32 of scaffold 30 via guide track 34. The method can also optionally include adjusting the heights of apparatus 202 and system 210 via height adjustable members 36. Through rotatable member 62 (FIGS. 5, 7, 11), a user can rotate equipment 4 about its centerline axis 51 during removal or before installation. In addition, a user can adjust rotatable member 62 without equipment 4 being coupled thereto to adjust the angular orientation of bracket 50.

The various embodiments discussed in this disclosure can offer several technical and commercial advantages. An advantage obtainable from embodiments of the present disclosure is the ability to position (e.g., install or remove) large and heavy components configured for use in a region inaccessible to conventional mechanical equipment (e.g., cranes). Another advantage realized from embodiments of the present disclosure is the ability to safely position heavy gas turbine combustors, which as an example may have a mass of up to, for example, approximately one thousand kilograms. An additional advantage is the ability to move and position gas turbine combustors which may be coupled to a fuel nozzle assembly.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
a height adjustable table having an upper surface;
an arm support structure rotatably coupled to and positioned above the height adjustable table, the arm support structure being rotatable between a plurality of positions about a vertical axis;
a length adjustable arm slidably connected to the arm support structure, the length adjustable arm being configured to support a piece of equipment; and
an equipment support bracket rotatably coupled to the length adjustable arm and configured to removably attach the piece of equipment, wherein the equipment support bracket extends at a non-parallel angle relative to the upper surface of the height adjustable table, such that rotation of the arm support structure and the equipment support bracket substantially aligns the piece of equipment with an equipment fixture point.

2. The apparatus of claim 1, further comprising a rotatable coupler interposed between the length adjustable arm and the arm support structure to provide rotatable coupling of the equipment support bracket.

3. The apparatus of claim 1, wherein the length adjustable arm is configured to support a mass of up to approximately 1000 kilograms.

4. The apparatus of claim 1, wherein the equipment support bracket is further configured to rotate the piece of equipment about an axial centerline axis of the piece of equipment.

5. The apparatus of claim 4, further comprising a lock configured to hold the piece of equipment at a particular angle relative to the equipment support bracket.

6. The apparatus of claim 1, wherein the length adjustable arm includes a plurality of pivoting joints, each of the plurality of pivoting joints being axially displaced from the arm support structure and having a rotation axis different from the vertical axis of the arm support structure.

7. A system comprising:
a scaffold having an upper surface;
a height adjustable table having an upper surface and slidably connected to and positioned above the upper surface of the scaffold;
an arm support structure rotatably coupled to and positioned above the height adjustable table, the arm support structure being rotatable between a plurality of positions about a vertical axis;
a length adjustable arm slidably connected to the arm support structure; and
an equipment support bracket coupled to the length adjustable arm, wherein the equipment support bracket further comprises:
a bracket body, and
a rotatable member rotatably coupled to the bracket body for removably attaching a piece of equipment, and extending at a non-parallel angle relative to the upper surface of the height adjustable table, such that rotation of the rotatable and the equipment support bracket substantially aligns the bracket body with an equipment fixture point, wherein the bracket body is further configured to lock to the rotatable member in one of a plurality of angular orientations relative to the upper surface of the height adjustable table.

8. The system of claim 7, wherein the rotatable member is configured to rotate the piece of equipment about an axial centerline axis of the piece of equipment.

9. The system of claim 7, wherein the length adjustable arm further includes a plurality of pivoting joints positioned between the arm support structure and the equipment support bracket, each of the plurality of pivoting joints being axially displaced from the arm support structure and having a rotation axis different from the vertical axis of the arm support structure.

10. The system of claim 7, wherein the height adjustable table is slidably connected to a guide track of the scaffold.

11. The system of claim 7, further comprising a rotatable coupler interposed between the length adjustable arm and the arm support structure.

* * * * *